United States Patent [19]

Grigo et al.

[11] Patent Number: 5,274,009

[45] Date of Patent: Dec. 28, 1993

[54] USE OF NUCLEAR AROMATIC SULFONIC ACID ESTERS FOR STABILIZING THERMOPLASTIC POLYCARBONATES AGAINST THE EFFECT OF GAMMA-RAYS

[75] Inventors: Ulrich Grigo, Kempen; Jürgen Kirsch, Leverkusen; Karsten-Josef Idel, Krefeld, all of Fed. Rep. of Germany; Charles Lundy, Pittsburgh, Pa.

[73] Assignees: Bayer Aktiengesellschaft, Leverkusen, Fed. Rep. of Germany; Miles Inc., Pittsburgh, Pa.

[21] Appl. No.: 951,445

[22] Filed: Sep. 25, 1992

[30] Foreign Application Priority Data

Oct. 1, 1991 [DE] Fed. Rep. of Germany ....... 4132629

[51] Int. Cl.$^5$ ............................ C08K 5/46; C08K 5/42
[52] U.S. Cl. ...................... 523/137; 524/83; 524/109; 524/110; 524/158; 524/265
[58] Field of Search .............. 523/137; 524/158, 109, 524/110, 265, 83

[56] References Cited

U.S. PATENT DOCUMENTS

| | | | |
|---|---|---|---|
| 3,385,814 | 5/1968 | Falkai et al. | 260/31.4 |
| 3,909,490 | 9/1975 | Mark | 260/45.7 S |
| 4,001,175 | 1/1977 | Mark | 260/45.7 S |
| 4,110,185 | 8/1978 | Williams et al. | 524/296 |
| 4,143,023 | 3/1979 | Mark et al. | 524/158 |
| 4,246,188 | 1/1981 | Peterson et al. | 524/158 |
| 4,274,991 | 6/1981 | Hinz et al. | 524/158 |
| 4,535,108 | 8/1985 | Rosenquist et al. | 524/162 |
| 4,539,358 | 9/1985 | Liu | 524/296 |
| 4,579,896 | 4/1986 | Rosenquist | 524/108 |
| 4,774,273 | 9/1988 | Kress et al. | 524/158 |
| 4,804,692 | 2/1989 | Lundy et al. | 523/137 |
| 4,880,855 | 11/1989 | Nelson et al. | 523/136 |
| 4,963,598 | 10/1990 | Krishnan et al. | 523/137 |
| 5,006,572 | 4/1991 | Lundy et al. | 524/109 |
| 5,118,726 | 6/1992 | Mizutani et al. | 523/136 |
| 5,187,211 | 2/1993 | Lundy et al. | 524/109 |

FOREIGN PATENT DOCUMENTS

| | | |
|---|---|---|
| 228525 | 10/1985 | European Pat. Off. . |
| 296473 | 12/1988 | European Pat. Off. . |
| 359366 | 3/1990 | European Pat. Off. . |
| 53-64262 | 6/1978 | Japan . |

OTHER PUBLICATIONS

Polymer Science-A Materials Science Handbook-vol. 1 editor A. D. Jenkins (1972) pp. 559 and 609-American Elsevier Pub.
Patent Abstracts of Japan, vol. 14, No. 143 (C-703) (4086), Mar. 19, 1990; & JP-A-2 013 460 (Mitsubishi Kasei Corp.) Jan. 17, 1990.

*Primary Examiner*—Veronica P. Hoke
*Attorney, Agent, or Firm*—Joseph C. Gil; Aron Preis

[57] ABSTRACT

A thermoplastic molding composition is disclosed containing a polycarbonate resin and (i) 0.1 to 10.0 percent of a polyalkylene oxide corresponding to formula (I)

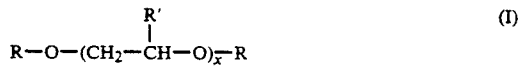

in which
R represents H, $C_{1-6}$ alkyl, tetrahydropyranyl or a silyl radical,
R' represents H or $C_{1-6}$ alkyl and
x is an integer of 1 to 100, and (ii) 0.1 to 10 percent of an aromatic compound which contains at least one sulfonic acid ester substituent, said percent being relative to the weight of said polycarbonate. The composition which is resistant to the effects of gamma radiation is suitable for the preparation of sterilizable medical instruments.

6 Claims, No Drawings

USE OF NUCLEAR AROMATIC SULFONIC ACID ESTERS FOR STABILIZING THERMOPLASTIC POLYCARBONATES AGAINST THE EFFECT OF GAMMA-RAYS

FIELD OF THE INVENTION

The invention relates to thermoplastic polycarbonate molding compositions, and in particular to compositions which are rendered resistant to the effects of exposure to gamma radiation.

SUMMARY OF THE INVENTION

A thermoplastic molding composition is disclosed containing a polycarbonate resin and (i) 0.1 to 10.0 percent of a polyalkylene oxide corresponding to formula (I)

$$R-O-(CH_2-\underset{\underset{R'}{|}}{CH}-O)_x-R \quad (I)$$

in which
R represents H, $C_{1-6}$ alkyl, tetrahydropyranyl or a silyl radical,
R' represents H or $C_{1-6}$ alkyl and
x is an integer of 1 to 100, and (ii) 0.1 to 10 percent of an aromatic compound which contains at least one sulfonic acid ester substituent, said percent being relative to the weight of said polycarbonate. The composition which is resistant to the effects of gamma radiation is suitable for the preparation of sterilizable medical instruments.

BACKGROUND OF THE INVENTION

By virtue of their physical properties, thermoplastic polycarbonates are suitable for applications in the medical field. For these applications, it is important that the corresponding articles and moldings of the thermoplastic polycarbonates can be sterilized indefinitely without being degraded. Sterilization is carried out by irradiation with gamma-rays because treatment with steam causes permanent damage to the polycarbonates.

However, irradiation with gamma-rays also causes permanent damage to the polycarbonates by causing them to turn yellow in color. The damage caused by gamma-rays is largely suppressed by the use of aromatic sulfonic acid ester compounds in accordance with the invention.

There are various methods for making thermoplastic polycarbonates resistant to the effect of gamma-rays (see, for example, EP-A-0 296 473, U.S. Pat. No. 4,804,692 (Mo 3005) and U.S. Pat. No. 4,963,598 (Mo 3047))

It is also known that polyalkylene oxides and halogenated polycarbonates can be used in combination with one another to stabilize halogen-free polycarbonates against the effect of gamma-rays (see EPA- 0 376 289).

In addition, it is known that polyalkylene oxides can be added to spinning solutions of polycarbonates to promote their crystallization (see U.S. Pat. No. 3,385,814).

Although aromatic sulfonic acid ester compounds are not known as additives in polycarbonates, the sulfonic acid salts are known as flameproofing agents (see U.S. Pat. No. 4,880,855, U.S. Pat. No. 4,579,896, U.S. Pat. No. 4,535,108 and U.S. Pat. No. 4,001,175). Aromatic sulfonic acid salts have a weaker effect against gamma-rays than aromatic sulfonic acid ester derivatives.

The combined effect of the two components on the resistance of thermoplastic polycarbonates to the effect of gamma-rays is thus neither known nor obvious.

DETAILED DESCRIPTION OF THE INVENTION

This invention relates to thermoplastic polycarbonates containing 0.1% by weight to 10.0% by weight and preferably 0.1% by weight to 5.0% by weight, based on the weight of polycarbonate, of polyalkylene oxides corresponding to formula (I)

$$R-O-(CH_2-\underset{\underset{R'}{|}}{CH}-O)_x-R \quad (I)$$

in which
R represents H, $C_{1-6}$ alkyl, tetrahydropyranyl or a silyl radical,
R' represents H or $C_{1-6}$ alkyl and
x is an integer of 1 to 100, and 0.1% by weight to 10% by weight and preferably 0.1% by weight to 5.0% by weight, again based on the weight of polycarbonate, of aromatic compounds bearing sulfonic acid ester substituents.

The above-mentioned combination of additives stabilizes the polycarbonate against the effect of gamma-rays, so that moldings produced from these polycarbonates may be used as sterilizable instruments, for example in medicine.

The thermoplastic polycarbonates to be stabilized in accordance with the invention are known from the literature. Polycarbonates to be stabilized in accordance with the invention are thermoplastic aromatic homopolycarbonates and copolycarbonates based, for example, on one or more of the following diphenols: hydroquinone, resorcinol, dihydroxy-diphenyls, bis-(hydroxyphenyl)-alkanes, bis-(hydroxyphenyl)-cycloalkanes, bis-(hydroxyphenyl)-sulfides, bis(hydroxyphenyl)-ethers, bis-(hydroxyphenyl)-ketones, bis-(hydroxyphenyl)-sulfoxides, bis-(hydroxyphenyl)-sulfones, α,α'-bis-(hydroxyphenyl)-diisopropylbenzenes and nucleus - alkylated and nucleus-halogenated compounds thereof. These and other suitable diphenols are described, for example, in U.S. Pat. Nos. 3,028,365, 3,275,601, 3,148,172, 3,062,781, 2,991,273, 3,271,367, 2,999,835, 4,982,014 and 2,999,846, in DE-OSS 1,570,703, 2,063,050, 2,063,052, 2,211,956, 2,211,957, in FR-PS 1,561,518 and in the book by H. Schnell entitled "Chemistry and Physics of Polycarbonates", Interscience Publishers, New York, 1964.

Preferred diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-methane, bis-(3,5-dimethyl-4-hydroxyphenyl)-sulfone, 2,4-bis-(3,5-dimethyl-4-hydroxyphenyl)-2-methyl-butane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 1,1-bis-(4-hydroxyphenyl)-3,3,5-trimethyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

Preferred aromatic polycarbonates are those based on one or more of the diphenols mentioned as preferred. Particularly preferred copolycarbonates are those based on 2,2-bis-4-hydroxyphenyl)-propane and one of the other diphenols mentioned as particularly preferred. Other particularly preferred polycarbonates are those based solely on 2,2-bis-(4-hydroxyphenyl)-propane or 1,1-bis-(4-hydroxyphenyl)-3,3,5-trimethyl cyclohexane.

The aromatic polycarbonates may be produced by known methods, for example by the melt transesterification process from bisphenol and diphenol carbonate and by the two-phase interfacial process from bisphenols and phosgene, as described in the literature cited above.

The aromatic polycarbonates may be branched by the incorporation of small quantities, preferably quantities of 0.05 to 2.0 mol-% (based on the diphenols used), of trifunctional or more than trifunctional compounds, for example those containing three or more than three phenolic hydroxy groups.

Polycarbonates of this type are described, for example, in DE-OSS 1,570,533, 1,595,762, 2,116,974, 2,113,347, in GB-PS 1,079,821, in U.S. Pat. No. 3,544,514 and in DE-OS 2,500,092.

Some of the compounds containing three or more phenolic hydroxy groups which may be used in accordance with the invention are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxy-phenylisopropyl)-phenol, 2,6-bis-(2'-hydroxy-5'-methyl-benzyl)-4-methylphenol, 2-(4-hydroxyphenyl)-2-(2,4-di-hydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

The aromatic polycarbonates should generally have a weight average molecular weights in the range from 10,000 to more than 200,000 and preferably in the range from 20,000 to 80,000, as determined by measurement of the relative viscosity in CH$_2$Cl$_2$ at 25° C. and at a concentration of 0.5 g in 100 ml CH$_2$Cl$_2$.

Chain terminators, such as for example phenol or halophenols or alkylphenols, in the calculated quantities are used in known manner to adjust the molecular weight MW of the polycarbonates.

The polyalkylene oxide suitable in the present invention corresponds to formula (I)

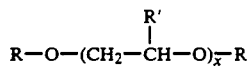
(I)

in which

R represents H, C$_{1-6}$ alkyl, tetrahydropyranyl or a silyl radical,

R' represents H or C$_{1-6}$ alkyl and x is an integer of 1 to 100.

Suitable polyalkylene oxides include polypropylene glycols having a number average molecular weight, as measured by GPC, in the range from 500 to 3,500 which are terminated by dihydropyran groups.

The polyalkylene oxides (I) are incorporated in the thermoplastic polycarbonates in known manner.

Suitable aromatic compounds containing sulfonic acid ester substituents are preferably those corresponding to formulae (II), (III), (IV) and (V)

 (II)

 (III)

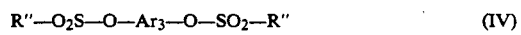 (IV)

 (V)

in which

Ar$_1$ is a two-valent mononuclear aromatic radical containing 6 to 20 carbon atoms or a binuclear radical corresponding to the formula —Ar'—M$_1$—Ar'—, in which Ar' is a phenylene radical which may be substituted by alkyl or halogen, M$_1$ is a C$_{1-5}$ alkylene, a group corresponding to the formula

with R$^{IV}$=H or C$_{1-4}$ alkyl,

M$_1$ may also represent SO$_2$, —S— or

Ar$_2$ is a single-bond mononuclear aromatic radical containing 6 to 20 carbon atoms which may bear 1 to 2 alkyl substituents, Ar$_3$ is a two-bond mononuclear aromatic radical containing 6 to 20 carbon atoms, which may bear 1 to 2 alkyl substituents, or a binuclear radical of the formula

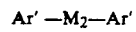

in which

Ar' is a phenylene radical which may be substituted by halogen or alkyl and

M$_2$ is a C$_{1-5}$ alkylidene, —SO$_2$—, —S— or

Ar₃ may also be a two-bond phenolphthalein group

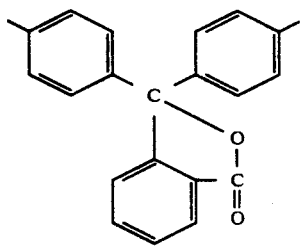

Ar₄ is a mononuclear aromatic $C_{6-20}$ radical.

In all cases of formula (II), (III) and (IV), R″ and R‴ are $C_{1-10}$ alkyl, $C_{5-6}$ cycloalkyl, $C_{6-10}$ aryl, $C_{7-10}$ aralkyl, Cl or Br.

Suitable examples of (II) are 4,4′-phenyl disulfonic acid phenyl ester, naphthyl disulfonic acid phenyl ester, 4,4′-di phenylsulfone disulfonic acid phenyl ester, 4,4′-benzophenone disulfonic acid phenyl ester, 4,4′-benzyldisulfonic acid phenyl ester.

Suitable examples of (III) are benzenesulfonic acid phenyl ester, toluenesulfonic acid phenyl ester, naphthylsulfonic phenyl ester.

Suitable examples of (IV) are bisphenol A dibenzenesulfonic acid ester, phenolphthalein dibenzenesulfonic acid ester, tetrabromobisphenol A dibenzenesulfonic acid ester, sulfonyl bis-benzene dibenzenesulfonic ester.

A suitable example of (V) is 1,8-naphthsultone.

The aromatic compounds bearing sulfonic acid ester substituents are incorporated in the thermoplastic polycarbonates in known manner.

Accordingly, the present invention also relates to a process for the production of the mixtures according to the invention, characterized in that polyalkylene oxides corresponding to formula (I) are incorporated in thermoplastic polycarbonates in quantities of 0.01% by weight to 10.0% by weight and preferably in quantities of 0.1% by weight to 5.0% by weight, based on the weight of polycarbonate, and aromatic compounds bearing sulfonic acid substituents are incorporated therein in quantities of 0.01% by weight to 10.0% by weight and preferably in quantities of 0.1% by weight to 5.0%. by weight, based on the weight of the polycarbonate, simultaneously or successively via the polycarbonate melt or via a solution of the polycarbonate in known inert solvents and, optionally after evaporation of the solvent, the mixtures obtained are cooled and granulated or directly extruded to moldings or cast to films.

The present invention also relates to stabilizer combinations of polyalkylene oxides corresponding to formula (I) in quantities of 0.01 part by weight to 10.0 parts by weight and preferably in quantities of 0.1 part by weight to 5.0 parts by weight with aromatic compounds bearing sulfonic acid substituents in quantities of 0.01 part by weight to 10.0 parts by weight and preferably in quantities of 0.1 part by weight to 5.0 parts by weight, the parts by weight of the components being selectable as required independently of one another within the defined range.

The usual additives, such as mold release agents, plasticizers, fillers and reinforcing materials may be added in known manner to the polycarbonates to be stabilized in accordance with the invention.

The polycarbonates stabilized in accordance with the invention may be processed to moldings of various kinds in known manner by extrusion or injection molding.

Accordingly, the present invention also relates to polycarbonate moldings produced from the mixtures according to the invention.

Suitable moldings for use in medicine are, for example, pipes for the supply of oxygen in the blood, vessels for kidney dialysis, hose connections and cardiac probes.

Accordingly, the present invention also relates to the use of the polycarbonate moldings according to the invention for the production of sterilizable instruments.

The treatment of the stabilized polycarbonate moldings with gamma-rays is carried out, for example, by irradiation with a 2 Me V van de Graff generator. This radiation source is calibrated in accordance with the relevant DIN specifications. A dose of 30 kGy (3 Mrad) can be applied in 6 minutes. The generator produces an electron current of 100 μA. In the material, the energy loss of the electrons is brought about mainly by ionization and also by radiation due to retarding of particles. The direct access to the radiation source allows the samples to be physically examined immediately after irradiation (where the greatest changes occur). Another advantage is that the radiation parameters can be varied. In commercial radiation sterilization, such variations are difficult.

The invention is further illustrated but is not intended to be limited by the following examples in which all parts and percentages are by weight unless otherwise specified.

EXAMPLES

Components used:
1. Benzenedisulfonic acid phenyl ester
2. Phenolphthalein diphenylsulfonic acid ester
3. Diphenylsulfone diphenylsulfonic acid
4. 1,8-Naphthsultone
5. Diphenylsulfone sulfonate, sodium salt
6. Dihydropyran-terminated polypropylene oxide corresponding to the following formula:

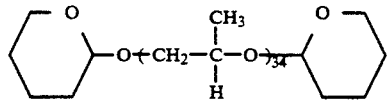

with an Mn of 2,000 (number average molecular weight as measured, for example, by GPC) of which the production is described in EP-OS 0 286 473, Example 1.

All the components were used in phenol-terminated bisphenol A polycarbonate having an Mw of 28,000.

EXAMPLE 1

A typical method of preparation of the sulfonic acid ester is described in the following. 94.11 g phenol were dissolved in 2,000 ml MeCl₂ and stirred. 202.30 g triethylamine were added. After purging with nitrogen, 70.1 g 1,3-benzodisulfonyl chloride were slowly added dropwise. The solution was stirred for 2 hours. The product was precipitated from the solution and washed with water. The melting point is 78° C.

EXAMPLE 2

The additives were incorporated in a polycarbonate resin by mixing extrusion and subsequently extruded. The injection moldings were irradiated with 3.0 Mrad. The radical concentration and the yellowness index were measured over a period of 10 days. Table I below shows the yellowness indices and delta yellowness indices measured for the polycarbonates and the additive-containing composition on 4 mm thick films 0 hours and 10 days after irradiation.

TABLE 1

| Composition | YI (0 hour) | YI (10 days) | Delta YI |
|---|---|---|---|
| Polycarbonate control | 5.7 | 26.0 | 20.3 |
| 0.5% Comp. 1 | 24.1 | 32.9 | 8.8 |
| 1.0% Comp. 1 | 23.6 | 30.6 | 7.0 |
| 0.5% Comp. 1, 0.5% Comp. 6 | 8.8 | 17.5 | 8.7 |
| 1.0% Comp. 1, 1.0% Comp. 6 | 8.5 | 14.5 | 6.0 |
| 1.0% Comp. 2 | 11.9 | 28.0 | 16.1 |
| 1.0% Comp. 2, 1.0% Comp. 6 | 8.1 | 14.0 | 5.9 |
| 1.0% Comp. 4 | 7.0 | 23.9 | 16.9 |
| 1.0% Comp. 4, 1.0% Comp. 6 | 4.2 | 9.8 | 5.6 |
| 1.0% Comp. 6 | 8.3 | 20.1 | 11.8 |

Table 2 shows the improvement provided by the sulfonic acid esters compared with sulfonic acid salts.

TABLE 2

| Composition | YI (0 hour) | YI (10 days) | Delta YI |
|---|---|---|---|
| Polycarbonate control | 5.7 | 26.0 | 20.3 |
| 1.0% Comp. 3 | 10.5 | 27.2 | 16.7 |
| 1.0% Comp. 3, 1.0% Comp. 6 | 8.1 | 14.0 | 5.9 |
| 1.0% Comp. 5 | 15.2 | 36.8 | 21.6 |
| 1.0% Comp. 5, 1.0% Comp. 6 | 8.4 | 21.4 | 13.0 |
| 1.0% Comp. 6 | 8.3 | 20.1 | 11.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a polycarbonate resin and (i) 0.01 to 10.0 percent of a polyalkylene oxide corresponding to formula (I)

$$R-O+CH_2-\underset{\underset{H}{|}}{\overset{\overset{R^1}{|}}{C}}-O)_x R \quad (I)$$

in which
R represents H, $C_{1-6}$ alkyl, tetrahydropyranyl or a silyl radical,
R' represents H or $C_{1-6}$ alkyl and
x is an integer of 1 to 100, and
(ii) 0.1. to 10 percent relative to the weight of said polycarbonate of at least one aromatic compound, containing at least one sulfonic acid ester substituent, which is selected from the group consisting of $$R''O-O_2S-Ar_1-SO_2-OR'' \quad (II)$$

$$Ar_2-SO_2-OR'' \quad (III)$$

$$R''-O_2S-O-Ar_3-O-SO_2-R''' \quad (IV) \text{ and}$$

$$Ar_4\underset{O}{\overset{SO_2}{\diagdown\diagup}} \quad (V)$$

in which
$Ar_1$ is a two-valent mononuclear aromatic radical containing 6 to 20 carbon atoms or a binuclear radical corresponding to the formula $$-Ar'-M_1-Ar'-,$$

in which
Ar' is a phenylene radical,
$M_1$ is a $C_{1-5}$ alkylene, $SO_2$, —S— or $$-\underset{\underset{O}{\|}}{C}-, \text{ or}$$

a group corresponding to the formula $$-\underset{\underset{R^{IV}}{|}}{C}=\underset{\underset{R^{IV}}{|}}{C}-$$

where $R^{IV}$ denotes H or $C_{1-4}$ alkyl,
$Ar_2$ is a single-bond mononuclear aromatic radical containing 6 to 20 carbon atoms,
$Ar_3$ is a two-bond mononuclear aromatic radical containing 6 to 20 carbon atoms, or a binuclear radical of the formula Ar'—$M_2$—Ar' or a di-valent phenolphthalein group in which
Ar' is a phenylene radical and
$M_2$ is a $C_{1-5}$ alkylidene, —$SO_2$—, —S— or $$-\underset{\underset{O}{\|}}{C}-,$$

$Ar_4$ is a mononuclear aromatic $C_{6-20}$ radical, and
R" and R'" are $C_{1-10}$ alkyl, $C_{5-6}$ cycloalkyl, $C_{6-10}$ aryl, $C_{7-10}$ aralykl, Cl or Br.

2. The molding composition of claim 1 wherein said (i) is present in an amount of about 0.1 to 5.0 percent.

3. The molding composition of claim 1 wherein said (ii) is present in an amount of about 0.1 to 5.0 percent.

4. The molding composition of claim 1 wherein said (i) is present in an amount of about 0.1 to 5.0 percent and said (ii) is present in an amount of 0.1 to 5.0 percent.

5. A polycarbonate article comprising the composition of claim 1.

6. A thermoplastic molding composition comprising a polycarbonate resin and (i) 0.01 to 10.0 percent of a polyalkylene oxide corresponding to formula (I)

in which
- R represent H, $C_{1-6}$ alkyl, tetrahydropyranyl or a silyl radical,
- R' represents H or $C_{1-6}$ alkyl and
- x is an integer of 1 to 100, and (ii) 0.1 to 10 percent of aromatic compounds containing at least one sulfonic acid ester substituents selected from the group consisting of 4,4'-phenyl disulfonic acid phenyl ester, naphthyl disulfonic acid phenyl ester, 4,4'-diphenylsulfone disulfonic acid phenyl ester, 4,4'-benzophenone disulfonic acid phenyl ester, 4,4'-benzyldisulfonic acid phenyl ester, benzenesulfonic acid phenyl ester, toluenesulfonic acid phenyl ester, naphthylsulfonic phenyl ester, bisphenol A dibenzenesulfonic acid ester, phenolphthalein dibenzene-sulfonic acid ester, tetrabromobisphenol A dibenzenesulfonic acid ester, sulfonyl bis-benzene dibenzenesulfonic acid ester and 1,8-naphthsultone, said percent being relative to the weight of said polycarbonate.

* * * * *